United States Patent
Kinjo

(10) Patent No.: US 11,266,933 B2
(45) Date of Patent: Mar. 8, 2022

(54) FILTER CONTAINER ATTACHMENT AND DETACHMENT SYSTEM

(71) Applicant: ROKI TECHNO CO., LTD., Tokyo (JP)

(72) Inventor: Takashi Kinjo, Tokyo (JP)

(73) Assignee: ROKI TECHNO CO., LTD., Tokyo (JP)

(*) Notice: Subject to any disclaimer, the term of this patent is extended or adjusted under 35 U.S.C. 154(b) by 300 days.

(21) Appl. No.: 16/479,210

(22) PCT Filed: Jan. 19, 2017

(86) PCT No.: PCT/JP2017/001791
§ 371 (c)(1),
(2) Date: Jul. 18, 2019

(87) PCT Pub. No.: WO2018/134951
PCT Pub. Date: Jul. 26, 2018

(65) Prior Publication Data
US 2019/0381432 A1    Dec. 19, 2019

(51) Int. Cl.
*B01D 35/30* (2006.01)

(52) U.S. Cl.
CPC .... *B01D 35/306* (2013.01); *B01D 2201/4023* (2013.01)

(58) Field of Classification Search
CPC .... B01D 35/147; B01D 35/30; B01D 35/306; B01D 2201/165; B01D 2201/4023
See application file for complete search history.

(56) References Cited

U.S. PATENT DOCUMENTS

| 5,397,462 A | 3/1995 | Higashijima et al. |
| 2001/0023843 A1 | 9/2001 | Senner et al. |
| 2013/0228509 A1* | 9/2013 | Kuruc ............ B01D 35/30 210/435 |

FOREIGN PATENT DOCUMENTS

| JP | 2005-521547 A | 7/2005 |
| JP | 2007-253154 A | 10/2007 |
| WO | 01/064312 A1 | 9/2001 |
| WO | 03/082435 A1 | 10/2003 |
| WO | 2016/185504 A1 | 11/2016 |
| WO | 2016/185506 A1 | 11/2016 |

OTHER PUBLICATIONS

International Preliminary Report on Patentability and Written Opinion issued in PCT/JP2017/001791, dated Jul. 23, 2019.

* cited by examiner

*Primary Examiner* — Patrick Orme
(74) *Attorney, Agent, or Firm* — BakerHostetler

(57) ABSTRACT

A attachment and detachment apparatus removably attaches a filter container containing a filter, as a part of a filtration apparatus that filters fluid with the filter. The filter container includes a first mounting protrusion having a filter container flow path in fluid communication with the filter. An outer periphery surface of the first mounting protrusion includes at least two curved surfaces respectively formed to be at least a part of an arc surface. The attachment and detachment apparatus includes a first mounting protrusion holding part that holds the first mounting protrusion. The first mounting protrusion holding part having a holding part flow path for the fluid and a notch communicating between an area surrounded by the inner periphery surface and an outer side of the first mounting protrusion holding part.

16 Claims, 12 Drawing Sheets

FILTER CONTAINER ATTACHMENT AND DETACHMENT SYSTEM

CROSS-REFERENCE TO RELATED APPLICATIONS

This application is a National Stage of International Patent App No. PCT/JP2017/001791, filed Jan. 19, 2017, the disclosure of which is incorporated by reference in its entirety.

TECHNICAL FIELD

The present invention relates to, for example, an attachment and detachment system for a filter container incorporating a filter, etc., thereinside.

BACKGROUND ART

In a flow path of an apparatus aimed at filtration of fluid, a filter container that incorporates a filter, etc., and that is removably arranged may be used in a part of the flow path. For example, when a predetermined amount of filtration ends, an old filter container is removed, and is replaced with a new filter container. In such a flow path, a manifold that lacks a part of the flow path is provided between an end of an upstream side flow path and an end of a downstream side flow path. The filter container includes a structure that can be removably attached between the end of this upstream side flow path and the end of the downstream side flow path. A flow channel is formed inside the filter container, and the both ends of the flow channel include a flow channel inlet and a flow channel outlet. A filter, etc., is arranged in the flow channel. Generally, the end of the upstream side flow path and the end of the downstream side flow path are configured as a part of the manifold, and when the filter container is attached to the manifold, the flow channel inlet of the filter container into which fluid flows joins to the end of the upstream side flow path, and the flow channel outlet from which the fluid is discharged joins to the end of the downstream side flow path. Accordingly, the flow channel in the filter container is connected to the flow path that lacks a part of the flow channel, and the flow path of a flow circuit system is completed. For example, PTL 1 to PTL 3 describe examples that attach a removable filter container to a manifold as a holder.

Each of PTL 1 to PTL 3 discloses an example that forms, as a part of an existing flow path, a flow path with a filter container that can be replaced by detaching and attaching. In PTL 1 to PTL 3, the distance between one end and the other end of a flow path on a manifold side is constant. In each of the Patent Literatures, the filter container includes, at one end of the filter container, a flow channel inlet from which fluid to be filtered flows into the filter container, and a flow channel outlet is arranged at the other end of the filter container on the opposite side of the flow channel inlet. Additionally, the direction in which the flow channel inlet extends, and the direction in which the flow channel outlet extends are the same directions.

PTL 1 and PTL 2 are examples in which a filter container is attached to a manifold by pivot movement. In the example of PTL 1, the filter container has a structure that can be contracted and extended, and in a state where the filter container is contracted, a lower flow path end of the filter container is inserted into a pivot of a manifold, an upper side of the filter container is moved into the manifold by a pivot operation in a state where the filter container is contracted, the filter container is extended, and the flow path of the filter container is connected to the flow path of the manifold so as to be inserted into the flow path of the manifold. However, when functions of contraction/extension are provided to the filter container, a structure of the filter container becomes complicated, and the problems of the cost for manufacturing the filter container and deterioration of durability occur.

On the other hand, in the example of PTL 2, the filter container does not have the functions of contraction/extension, a lower flow path end of the filter container is made into a spherical body, and an upper side of the filter container is moved into the manifold by pivot operation while making the spherical body serve as a pivot, such that the flow path of the filter container is inserted in the flow path of the manifold. However, in such attachment of the filter container by the pivot operation, since the range of movement of the opposite side end of the pivot is wide, the rubbing distance of a sealing member is long, and abrasion of the sealing member becomes large, which lead to the problem of dust generation.

Meanwhile, in PTL 3, an example of configuring a filter container such that the filter container can be attached and detached without using a pivot operation is disclosed. In PTL 3, the filter container is installed between an end of an upstream side flow path and an end of a downstream side flow path of a manifold by a translation operation from a direction perpendicular to a virtual straight line connecting these flow paths, such that the direction of the flow channel inlet and the flow channel outlet of the filter container is aligned with the direction of the virtual straight line.

CITATION LIST

Patent Literature

PTL 1: U.S. Pat. No. 5,397,462
PTL 2: Japanese Patent Application Laid-Open No. 2007-253154
PTL 3: U.S. Publication No. 2013/0228509

SUMMARY OF INVENTION

Technical Problem

In an apparatus aimed at filtration of fluid, in order to make it possible to removably attach a filter container to a manifold, it is necessary for the joining portion of the fluid inlet/outlet of the filter container and the fluid inlet/outlet of the manifold to have a high degree of sealing, so as to prevent leakage of the fluid. However, as disclosed in PTL 3, in the attachment and detachment apparatus with which the distance between one end and the other end of a flow path on a manifold side is constant, and a filter container is attached by a translation operation, when a high degree of adhesion is secured for the joining portion of the fluid inlet/outlet of the filter container and the fluid inlet/outlet of the manifold, friction at the joining portion of the fluid inlet/outlet of the filter container and the fluid inlet/outlet of the manifold becomes large, and attachment and detachment work becomes difficult. Therefore, in the attachment and detachment apparatus with which the distance between one end and the other end of the flow path on the manifold side is constant, and the filter container is attached by a translation operation, it is required to perform each attachment and detachment while securing a high degree of adhesion. Especially, when the filter container is detached, it is desired that attachment is performed by a simplified method.

Solution to Problem

A solution is made by an attachment and detachment apparatus that removably attaches a filter container in which a filter is contained therein, as a part of a filtration apparatus that filters fluid with the filter, the filter container including a first mounting protrusion provided at one end of the filter container to protrude from the filter container, the first mounting protrusion including a flow path communicating with the filter inside the filter container, wherein the first mounting protrusion includes a rotation center axis, wherein an outer periphery surface of the first mounting protrusion includes at least two curved surfaces respectively formed to be at least a part of an arc about the rotation center axis in a cross-section perpendicular to the rotation center axis, and two surfaces connected to the at least two curved surfaces, the attachment and detachment apparatus including a first mounting protrusion holding part configured to hold the first mounting protrusion, wherein the flow path for the fluid is connected to the first mounting protrusion holding part, wherein the first mounting protrusion holding part includes an inner periphery surface corresponding to the curved surface of the outer periphery surface, and a notch communicating the inner periphery surface with an outer side of the first mounting protrusion holding part, and a width of the notch is greater than a width of a longer one of chords of the arcs of the two curved surfaces.

Advantageous Effects of Invention

According to the present invention, it becomes possible to attach and detach a filter container only by a translation operation and a rotating operation of the filter container.

BRIEF DESCRIPTION OF DRAWINGS

FIG. 5B is a diagram corresponding to FIG. 4B in the embodiment of FIG. 5A, and showing a state where a first flow path 2a of a first mounting protrusion 21 matches an opening 31b of an inner periphery surface 31a.

FIG. 5D is a diagram corresponding to FIG. 4B in the embodiment of FIG. 5C, and showing a state where the first flow path 2a of the first mounting protrusion 21 matches the opening 31b of the inner periphery surface 31a.

DESCRIPTION OF EMBODIMENTS

Embodiment 1

Figure 1:
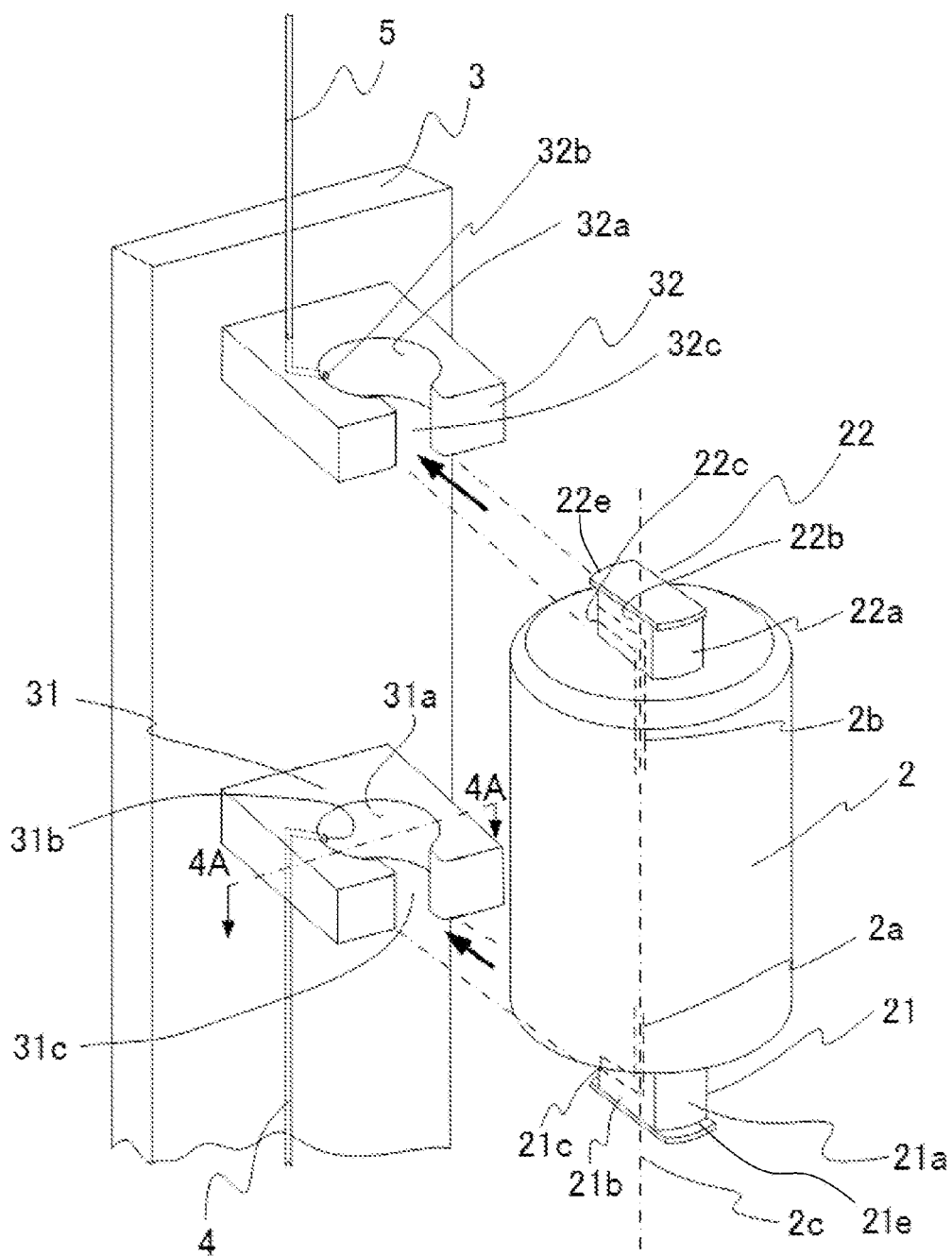
FIG. 1 shows an attachment and detachment apparatus of Embodiment 1 to which the present invention is applied, in a state before a filter container is installed to a manifold.

With reference to FIG. 1 to FIG. 5A to FIG. 5D, Embodiment 1 of the present invention will be described. FIG. 1 shows a filter container attachment and detachment apparatus 1 in a filtration apparatus used for filtration of fluid with a filter in Embodiment 1 of the present invention. The filter container attachment and detachment apparatus 1 is an attachment and detachment apparatus that is attached to a manifold 3, and to/from which a filter container 2 incorporating a filter is attached/detached. FIG. 1 shows a state where the filter container 2 is separated.

The filter container 2 is a capsule-shaped container incorporating a filter (not shown) in an internal space. The filter container 2 includes a first mounting protrusion 21 that extends so as to project from the filter container 2. Additionally, the filter container 2 includes a second mounting protrusion 22 at an end opposite to a side at which the first mounting protrusion 21 is arranged. A first flow path 2a and a second flow path 2b are connected to the internal space (not shown) where the filter inside the filter container 2 is arranged. The first flow path 2a is disposed in the first mounting protrusion 21 from the internal space (not shown), and the second flow path 2b is disposed in the second mounting protrusion 22 from the internal space.

The filter container 2 includes a rotation center axis 2c defined in directions from the filter container 2 to the first mounting protrusion 21 and to the second mounting protrusion 22. The rotation center axis is defined as the rotation center axis of the first mounting protrusion 21, and the rotation center axis of the second mounting protrusion 22 that is concentric with the rotation center axis of the first mounting protrusion 21.

The first mounting protrusion 21 includes at least two curved surfaces 21a formed to be at least a part of the arc of a circle about the rotation center axis 2c in a cross-section perpendicular to the rotation center axis 2c, and two surfaces 21b connected to each of the curved surface 21a. Similarly, the second mounting protrusion 22 includes at least two curved surfaces 22a formed to be at least a part of the arc of a circle about the rotation center axis 2c in a cross-section perpendicular to the rotation center axis 2c, and two surfaces 22b connected to each of the curved surface 22a. Typically, the two surfaces 21b and the two surfaces 22b are respectively parallel to each other, but may be set to have an angle.

The first flow path 2a in the first mounting protrusion 21 communicates with one of the at least two curved surfaces 21a, so as to form a filter container flow path hole 21c. Similarly, the second flow path 2b in the second mounting protrusion 22 communicates with an arbitrary portion of one of the two curved surfaces 22a, so as to form a filter container flow path hole 22c. Typically, as shown in FIG. 1, the communication is made such that the filter container flow path hole 22c is formed in the curved surface 22a in a direction corresponding to a side on which the filter container flow path hole 21c is formed. That is, the filter container flow path hole 21c and the filter container flow path hole 22c are formed on the same side. Then, the filter container flow path hole 21c and the filter container flow path hole 22c can be arranged at the same angular position about the rotation center axis 2c. However, although in this embodiment the communication is made such that the filter container flow path hole 22c is formed in the curved surface 22a in the direction corresponding to the side on which the filter container flow path hole 21c is formed, this may be formed in the curved surface 22a on the opposite side. Additionally, the filter container flow path hole 21c and the filter container flow path hole 22c may be arranged at different angular positions about the rotation center axis 2c.

In this description, an example is described in which the filter container flow path hole 21c and the filter container flow path hole 22c are arranged in a surfaces on the same side and at the same angular position about the rotation center axis 2c. For example, the first flow path 2a and the second flow path 2b extend toward the first mounting protrusion 21 and the second mounting protrusion 22 from the internal space, respectively, and are made to bent, for example, perpendicularly toward the curved surface 21a and the curved surface 22a from there, respectively. However, even if not perpendicular, the filter container flow path hole 21c and the filter container flow path hole 22c may be formed in the curved surface 21a and the curved surface 22a, respectively. Sealants 21d, such as gaskets and packings, with which fluid does not flow out of the filter container flow path hole 21c and the filter container flow path hole 22c are arranged around the filter container flow path hole 21c and the filter container flow path hole 22c. Although in this embodiment the communication is made such that the filter container flow path hole 22c is formed in the curved surface 22a in the direction corresponding to the side on which the filter container flow path hole 21c is formed, this may be formed in the curved surface 22a on the opposite side.

For example, as in this embodiment, in the filter container 2, the orientations of the first mounting protrusion 21 and the second mounting protrusion 22 are set to have the same angle about the rotation center axis 2c of the filter container 2. Additionally, the filter container flow path hole 21c and the filter container flow path hole 22c can also be arranged at the same angular position about the rotation center axis 2c. However, this angle can also be changed. Further, additionally, the position of the filter container flow path hole 21c of the first flow path 2a in the first mounting protrusion 21 and the position of the filter container flow path hole 22c of the second flow path 2b in the second mounting protrusion 22 can be set to have arbitrary directions (different angles) about the rotation center axis 2c of the filter container 2. In this embodiment, as an example, typically, the position of the filter container flow path hole 21c and the position of the filter container flow path hole 22c have arbitrary directions (the same angle) about the rotation center axis 2c of the filter container 2.

The manifold 3 is a part of a flow circuit as the filtration apparatus that performs filtering of fluid. For the fluid to be filtered, the manifold 3 includes an upstream flow path 4 and a downstream flow path 5. The upstream flow path 4 is connected to a first mounting protrusion holding part 31, and the downstream flow path 5 is connected to a second mounting protrusion holding part 32. The flow circuit includes a missing portion of the flow channel between the first mounting protrusion holding part 31 and the second mounting protrusion holding part 32, and the first flow path 2a and the second flow path 2b of the filter container 2 attached to the manifold 3, and the internal space of the filter container 2 compensate the missing portion. Although this embodiment is described as an embodiment in which the upstream flow path 4 is on a lower side in a vertical direction and the downstream flow path 5 is on a upper side in the vertical direction, conversely, the upstream flow path 4 may be on the upper side in the vertical direction and the downstream flow path 5 may be on the lower side in the vertical direction.

The first mounting protrusion holding part 31 includes a cylindrical through-hole in a center portion. The first mounting protrusion holding part 31 includes a notch 31c that communicates the through-hole with an outer side of the first mounting protrusion holding part 31. A shape of an inner periphery surface 31a of the through-hole is such that an arbitrary cross-section perpendicular to the rotation center axis 2c of the filter container 2 in a state where the filter container 2 is attached to the manifold 3 becomes an arc of a circle about the rotation center axis 2c in the middle of the first mounting protrusion 21. The diameter of the circle is set to be almost a surface-to-surface distance between one and the other of the at least two curved surfaces 21a. Further, particularly, since the sealant 21d is arranged at one of the at least two curved surfaces 21a, the shape of the inner periphery surface 31a of the through-hole is such a shape that this sealant 21d is crushed, and the at least two curved surfaces 21a are sandwiched by the inner periphery surface 31a of the through-hole. When length of the chords of the arcs of the at least two curved surfaces 21a are equal, a width of the notch 31c has the length of the chord, and when the lengths of the chords of the arcs of the at least two curved surfaces 21a are different, the width of the notch 31c has a width greater than the longer one of the chords. In the present embodiment shown in FIG. 1 to FIG. 5A to FIG. 5D, since the lengths of the chords of the arcs of the at least two curved surfaces 21a are equal, an opening width of the notch is the length of the chord of the arc of the curved surface 21a. The first mounting protrusion 21 includes a flange 21e, and a diameter of the flange 21e is larger than a diameter of the inner periphery surface 31a of the first mounting protrusion holding part 31. Similarly, the second mounting protrusion 22 includes a flange 22e, and a diameter of the flange 22e is larger than a diameter of an inner periphery surface 32a of the first mounting protrusion holding part 32.

On the other hand, the shape of the second mounting protrusion holding part 32 is also the same. The second mounting protrusion holding part 32 includes a cylindrical through-hole in a center portion. The second mounting protrusion holding part 32 includes a notch 32c that communicates the through-hole with an outer side of the second mounting protrusion holding part 32. A shape of an inner periphery surface 32a of the through-hole is such that an arbitrary cross-section perpendicular to the rotation center axis 2c of the filter container 2 in the state where the filter container 2 is attached to the manifold 3 becomes an arc of a circle about the rotation center axis 2c in the middle of the second mounting protrusion 22. When lengths of the chords of the arcs of the at least two curved surfaces 22a are equal, a width of the notch 31c has the length of the chord, and when the lengths of the chords of the arcs of the at least two curved surfaces 22a are different, the width of the notch 31c has a width greater than the longer one of the chords.

The upstream flow path 4 communicates with an opening 31b formed in the inner periphery surface 31a of the first mounting protrusion holding part 31. The downstream flow path 5 communicates with an opening 32b formed in the inner periphery surface 32a of the second mounting protrusion holding part 32. In the state where the filter container 2 is attached to the manifold 3, the opening 31b and the opening 32b are set such that an angle formed by the opening 31b and the opening 32b about the rotation center axis 2c forms an angle formed by the filter container flow path hole 21c of the first mounting protrusion 21 and the filter container flow path hole 22c of the second mounting protrusion 22 of the filter container 2. Typically, since it is simple in use to set the angle formed by the opening 31b and the opening 32b about the rotation center axis 2c in the state where the filter container 2 is attached to the manifold 3 as 0 degrees or 180 degrees, in this case, the angle formed by the filter container flow path hole 21c of the first mounting protrusion 21 and the filter container flow path hole 22c of the second mounting protrusion 22 of the filter container 2 is also set to 0 degrees or 180 degrees.

Figure 2:
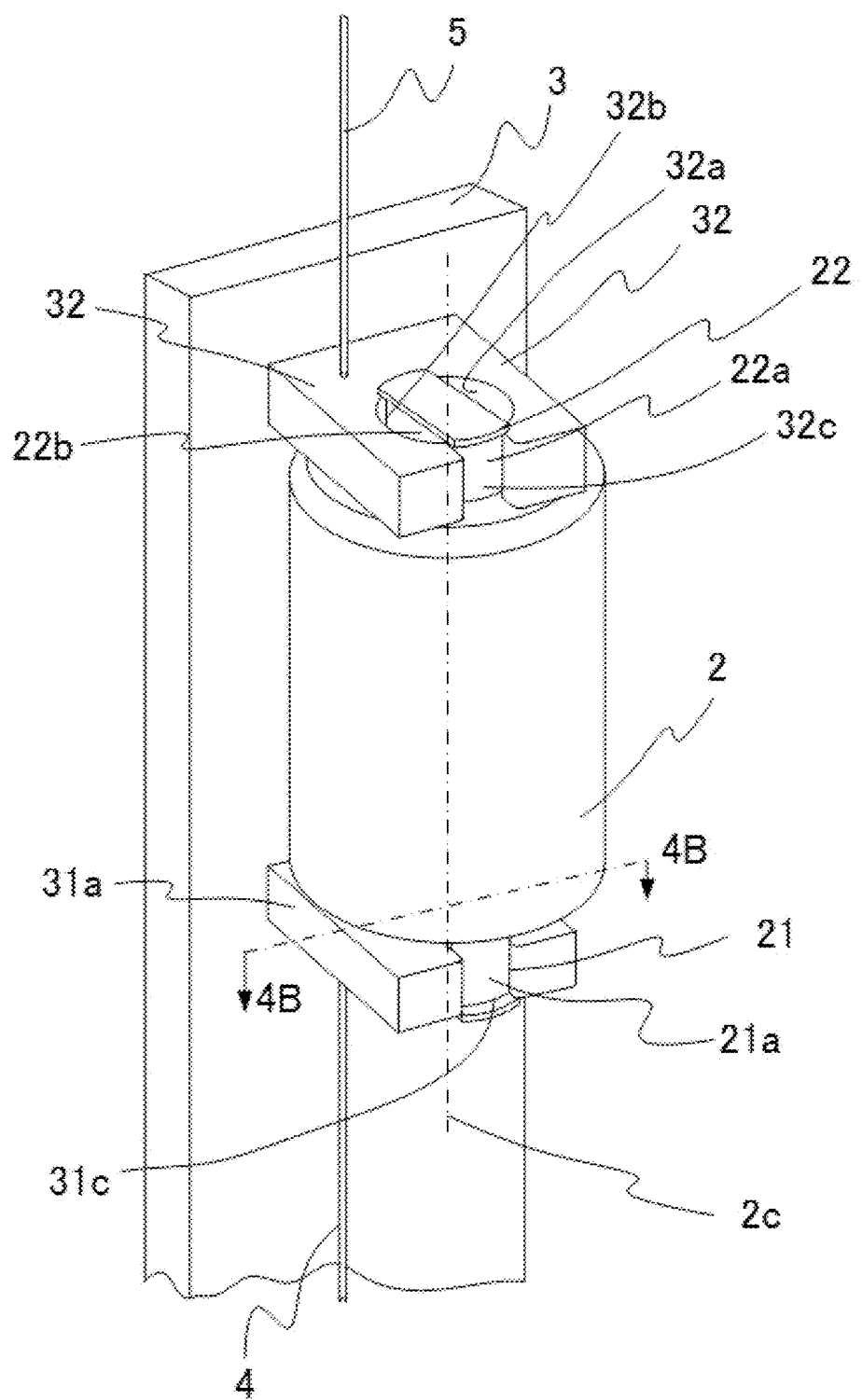
FIG. 2 shows the attachment and detachment apparatus of Embodiment 1 to which the present invention is applied, in a state after the filter container is installed to the manifold, and before the filter container is fixed to the manifold.
Figure 3:
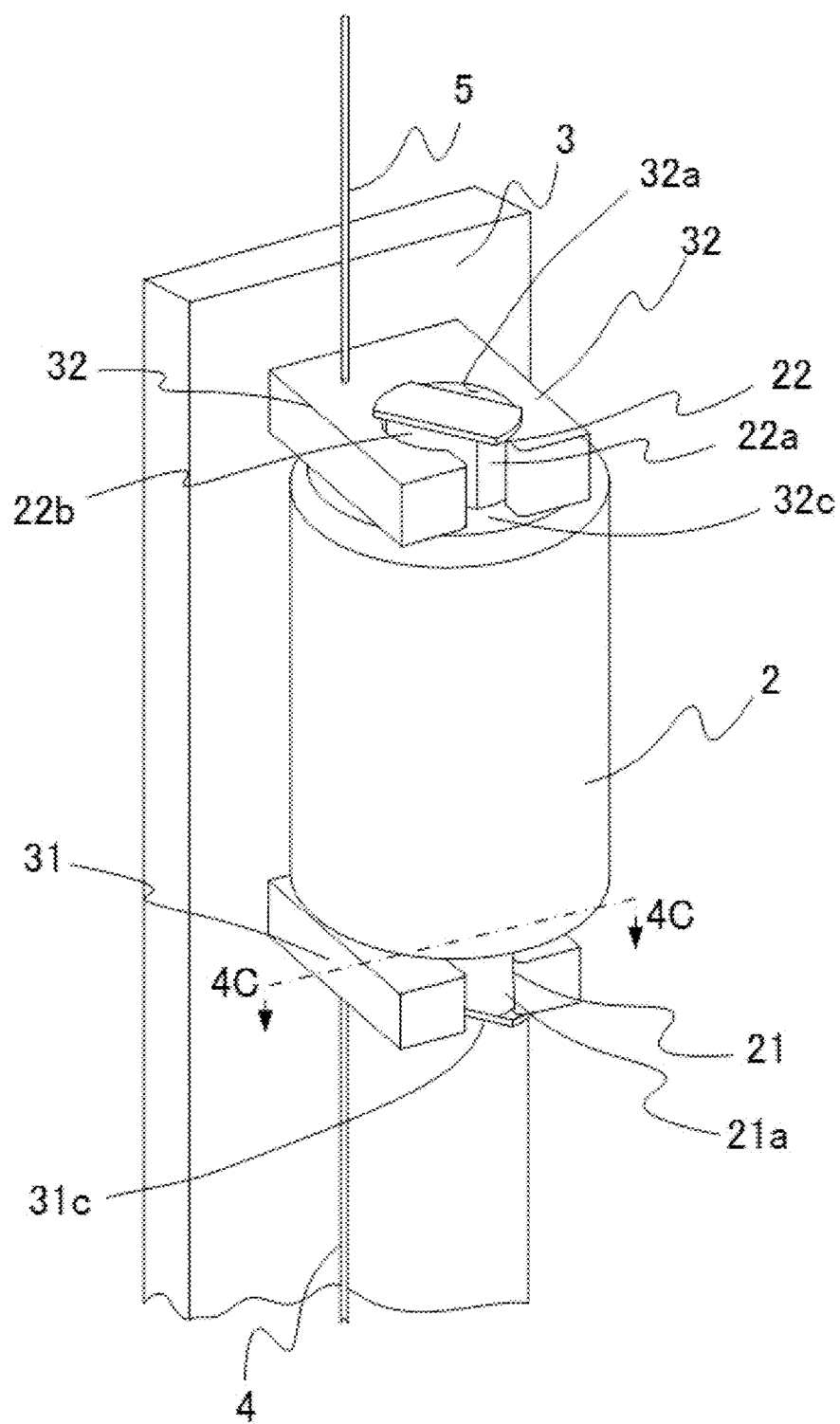
FIG. 3 shows the attachment and detachment apparatus of Embodiment 1 to which the present invention is applied, in a state after the filter container is installed to the manifold, and after the filter container is fixed to the manifold.
Figure 4A:
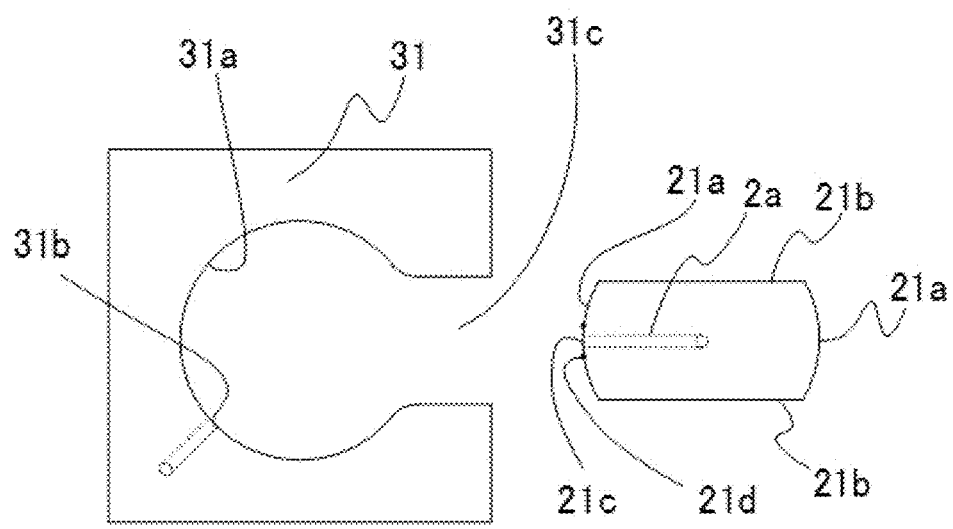
FIG. 4A is a diagram showing the cross-section 4A-4A of FIG. 1.
Figure 4B:
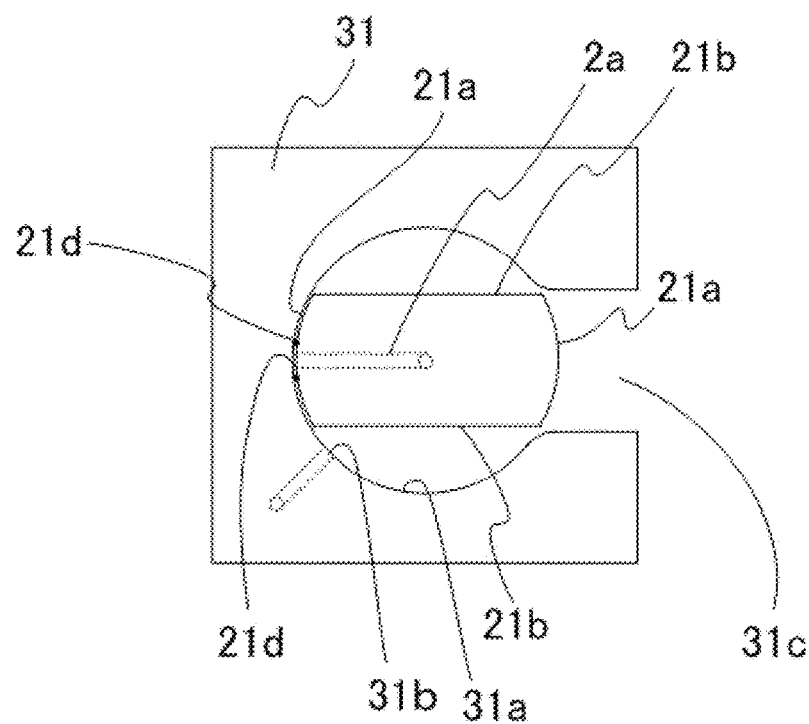
FIG. 4B is a diagram showing the cross-section 4B-4B of FIG. 2.
Figure 4C:
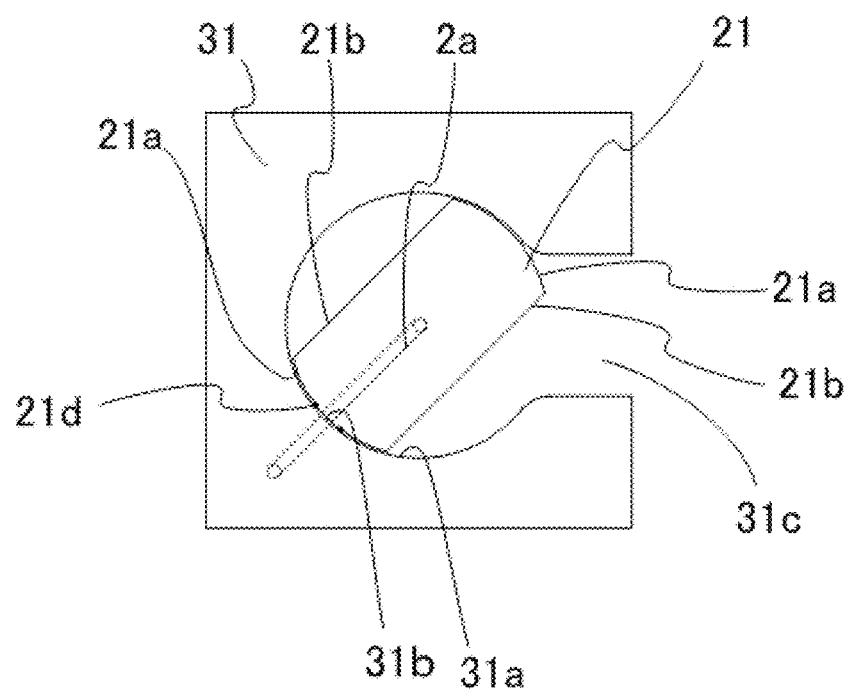
FIG. 4C is a diagram showing the cross-section 4C-4C of FIG. 3.

Subsequently, with reference to FIG. 2, FIG. 3, and FIG. 4A to FIG. 4C, a description will be given of a method of attaching the filter container 2 to the manifold with their respective states. FIG. 2 shows a pre-fixing state where the filter container 2 is installed to the manifold 3. FIG. 3 shows a post-fixing state where the filter container 2 is installed to the manifold 3. FIG. 4A, FIG. 4B, and FIG. 4C are a diagram showing cross-section 4A-4A of FIG. 1, a diagram showing cross-section 4B-4B of FIG. 2, and a diagram showing cross-section 4C-4C of FIG. 3, respectively.

First, the filter container 2 is attached to the manifold 3. On this occasion, the filter container 2 is attached to the manifold 3 such that the first mounting protrusion 21 is inserted into the notch 31c of the first mounting protrusion holding part 31, and the second mounting protrusion 22 is inserted into the notch 32c of the second mounting protrusion holding part 32, respectively (FIG. 1 and FIG. 2). On this occasion, the first mounting protrusion 21 is inserted (FIG. 4B) until one of the curved surfaces 21a contacts the inner periphery surface 31a of the first mounting protrusion holding part 31 (when a sealing member is arranged on the inner periphery surface 31a, until the sealing member is contacted), such that the surfaces 21b follow along wall surfaces of the notch 31c (FIG. 4A). Here, "one of the curved surfaces 21a contacts the inner periphery surface 31a of the first mounting protrusion holding part 31" includes that the sealant 21d as a part of the curved surface 21a contacts the inner periphery surface 31a of the first mounting protrusion holding part 31. On this occasion, the position of the filter container flow path hole 21c does not match the position of the opening of the inner periphery surface 31a of the first mounting protrusion holding part 31. Therefore, in this state, the upstream flow path 4 and the first flow path 2a are not connected to each other, and the upstream flow path 4 and the first flow path 2a are not fluidly connected to each other. In the relationship between the second mounting protrusion holding part 32 and the second mounting protrusion 22, they are also attached in the same procedure. Similarly, the downstream flow path 5 and the second flow path 2b are not fluidly connected to each other.

Subsequently, the filter container 2 is rotated to the position at which the upstream flow path 4 and the first flow path 2a are fluidly connected to each other, and the downstream flow path 5 and the second flow path 2b are fluidly connected to each other about the rotation center axis 2c of the filter container 2 (FIG. 4C). On this occasion, the sealant 21d is crushed by the inner periphery surface 31a of the first mounting protrusion holding part 31, and the inner periphery surface 31a of the first mounting protrusion holding part 31 sandwiches the first mounting protrusion 21. The relationship between the second mounting protrusion holding part 32 and the second mounting protrusion 22 is also the same. In this state, the upstream flow path 4 and the first flow path 2a are connected to each other for the first time, and the upstream flow path 4 and the first flow path 2a are fluidly connected to each other. A route is completed in which the fluid passes from the upstream flow path 4 to the downstream flow path 5 through the filter in the filter container 2 via the first flow path 2a, and via the second flow path 2b.

Figure 5A:
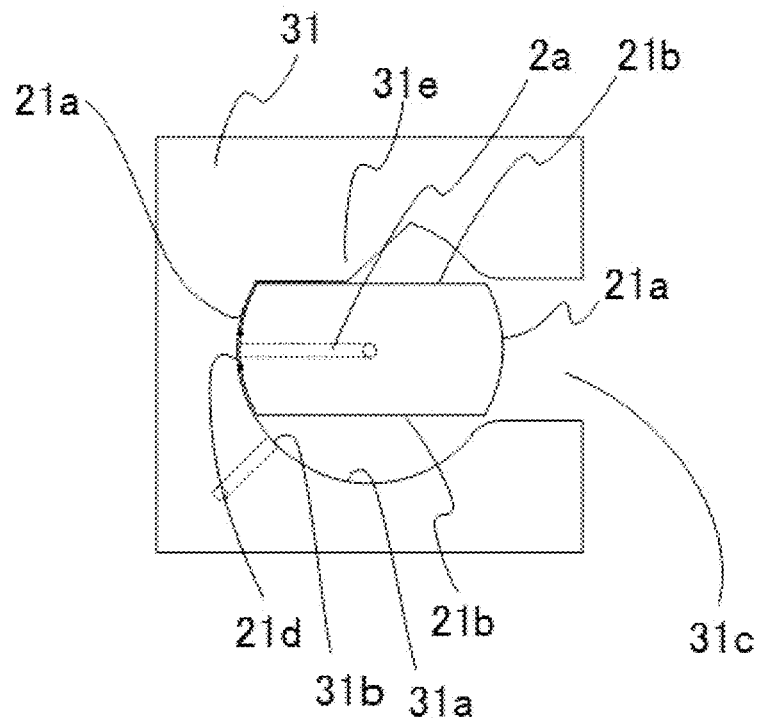
FIG. 5A is a diagram corresponding to FIG. 4B in an embodiment of the present invention, and showing a state where a first mounting protrusion is inserted from a notch of a first mounting protrusion holding part.
Figure 5B:
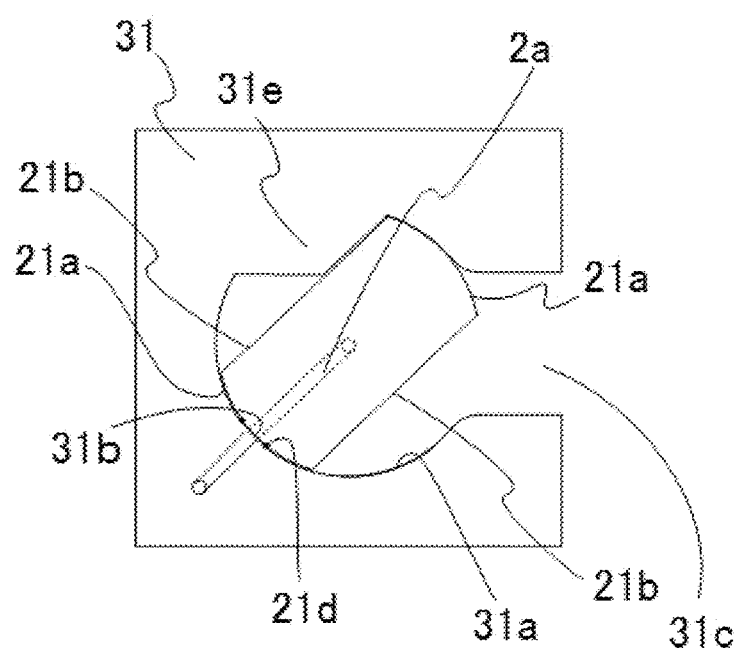
Figure 5C:
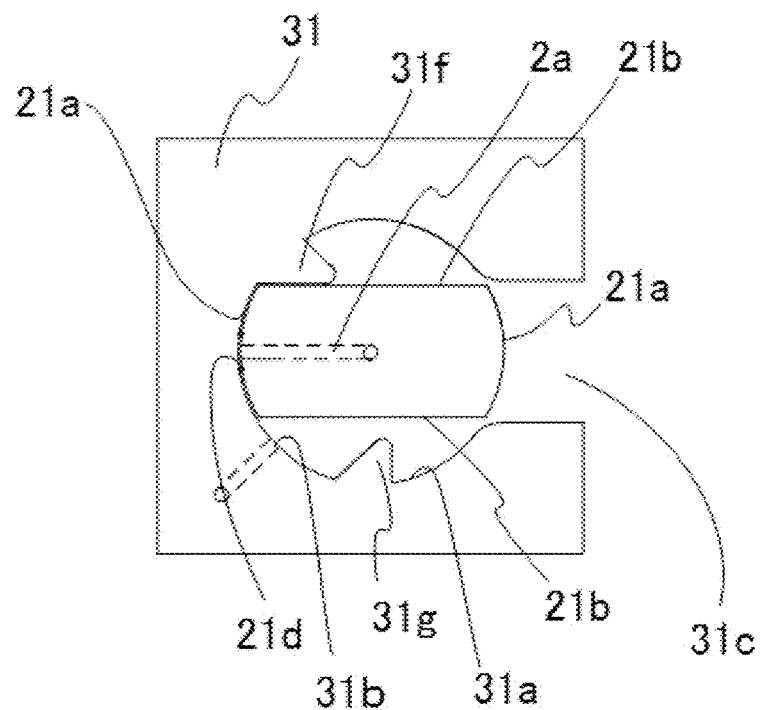
FIG. 5C is a diagram corresponding to FIG. 4B in another embodiment of the present invention, and showing a state where the first mounting protrusion is inserted from the notch of the first mounting protrusion holding part.
Figure 5D:
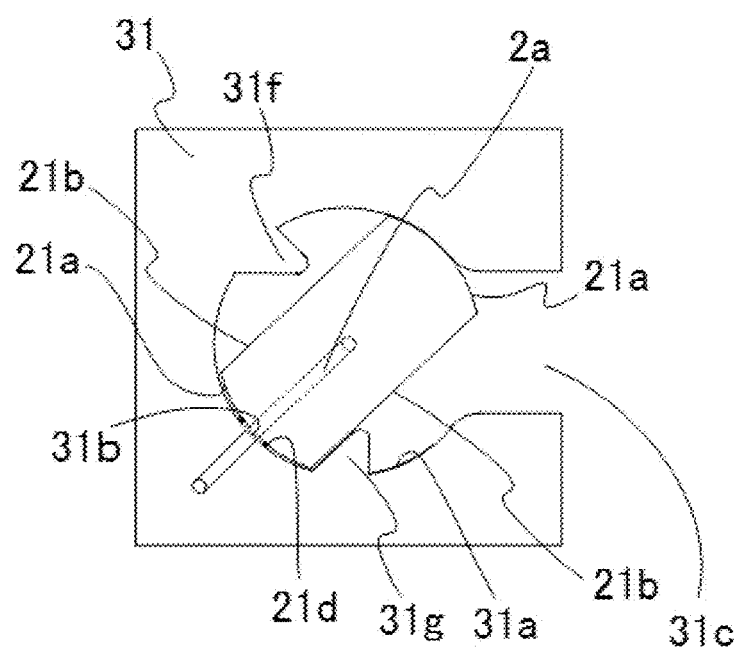

FIG. 5A and FIG. 5B describe a modification of the present embodiment. In this modification, the shape of the inner periphery surface 31a of the first mounting protrusion holding part 31 is different. That is, a projection 31e is arranged at the inner periphery surface 31a of the first mounting protrusion holding part 31. The projection 31e has a shape that projects from a wall surface on the opposite side of the notch 31c with respect to the rotation axis 2c. The projection 31e includes a surface that follows along the surface 21b, when the first mounting protrusion 21 is inserted from the notch 31c of the first mounting protrusion holding part 31, such that the surfaces 21b follow along the wall surfaces of the notch 31c. That is, the projection 31e can be arranged at the position that can prevent the reverse rotation such that the first mounting protrusion 21 does not move to a side opposite to a side toward the opening 31b of the first mounting protrusion holding part 31. Additionally, the projection 31e includes a surface that follows along the surface 21b at the position at which the first flow path 2a of the first mounting protrusion 21 matches the opening 31b of the inner periphery surface 31a after the first mounting protrusion 21 is inserted from the notch 31c. In this manner, when the first mounting protrusion 21 is inserted from the notch 31c of the first mounting protrusion holding part 31, if one of the surfaces of the projection 31e contacts the surface 21b of the first mounting protrusion 21, and regulates a moving direction of the first mounting protrusion 21 so that the first mounting protrusion 21 is rotated to an appropriate rotational direction (FIG. 5A), and when the first mounting protrusion 21 is rotated from there, the other surface of the projection 31e contacts the surface 21b of the first mounting protrusion 21, and regulates the moving direction of the first mounting protrusion 21, and at the position, the first flow path 2a of the first mounting protrusion 21 matches the opening 31b of the inner periphery surface 31a (FIG. 5B). On the other hand, FIG. 5C and FIG. 5D are examples of a projection 31f and a projection 31g of another embodiment. In the embodiment shown in FIG. 5A and FIG. 5B, the movement in the two directions of the first mounting protrusion 21 is regulated by one projection 31e. In the embodiment shown in FIG. 5C and FIG. 5D, the movement in the respective directions is regulated by the two projections, i.e., the projection 31f and the projection 31g. That is, the projection 31f has a shape that projects from a wall surface on the opposite side of the notch 31c with respect to the rotation axis 2c, and includes a surface that follows along the surface 21b, when the first mounting protrusion 21 is inserted from the notch 31c of the first mounting protrusion holding part 31, such that the surfaces 21b follow along the wall surfaces of the notch 31c. On the other hand, the projection 31g includes a surface that follows the surface 21b at the position at which the first flow path 2a of the first mounting protrusion 21 matches the opening 31b of the inner periphery surface 31a, after the first mounting protrusion 21 is inserted from the notch 31c. In this manner, when the first mounting protrusion 21 is inserted from the notch 31c of the first mounting protrusion holding part 31, if a surfaces of the projection 31f contacts the surface 21b of the first mounting protrusion 21, and regulates the moving direction of the first mounting protrusion 21 so that the first mounting protrusion 21 is rotated to an appropriate rotational direction (FIG. 5C), and when the first mounting protrusion 21 is rotated from there, a surface of the projection 31g contacts the surface 21b of the first mounting protrusion 21, and regulates the moving direction of the first mounting protrusion 21, and at the position, the first flow path 2a of the first mounting protrusion 21 matches the opening 31b of the inner periphery surface 31a (FIG. 5D).

Embodiment 2

Figure 6:
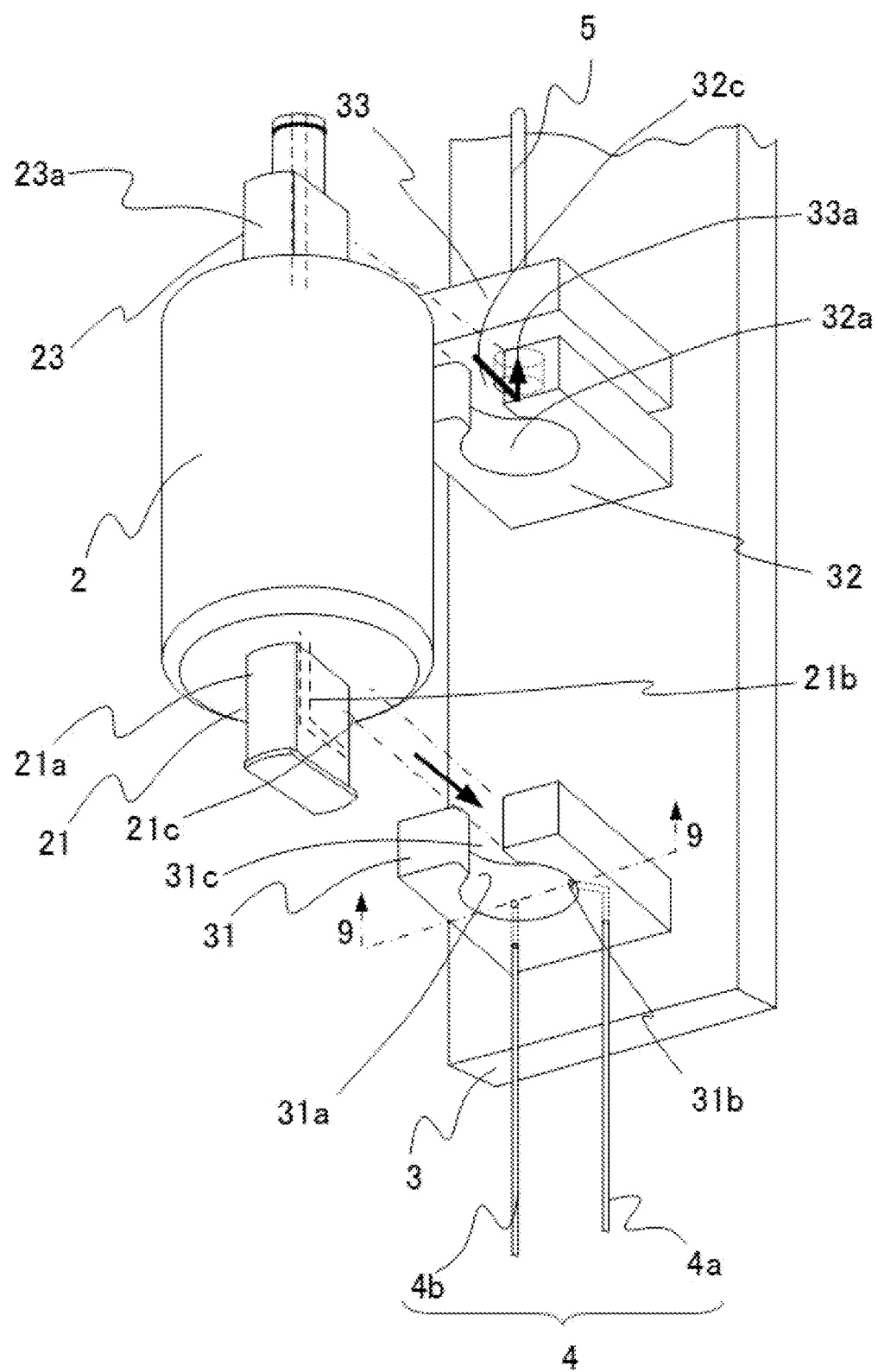
FIG. 6 shows an attachment and detachment apparatus of Embodiment 3 to which the present invention is applied, in a state before the filter container is installed to the manifold.
Figure 7:
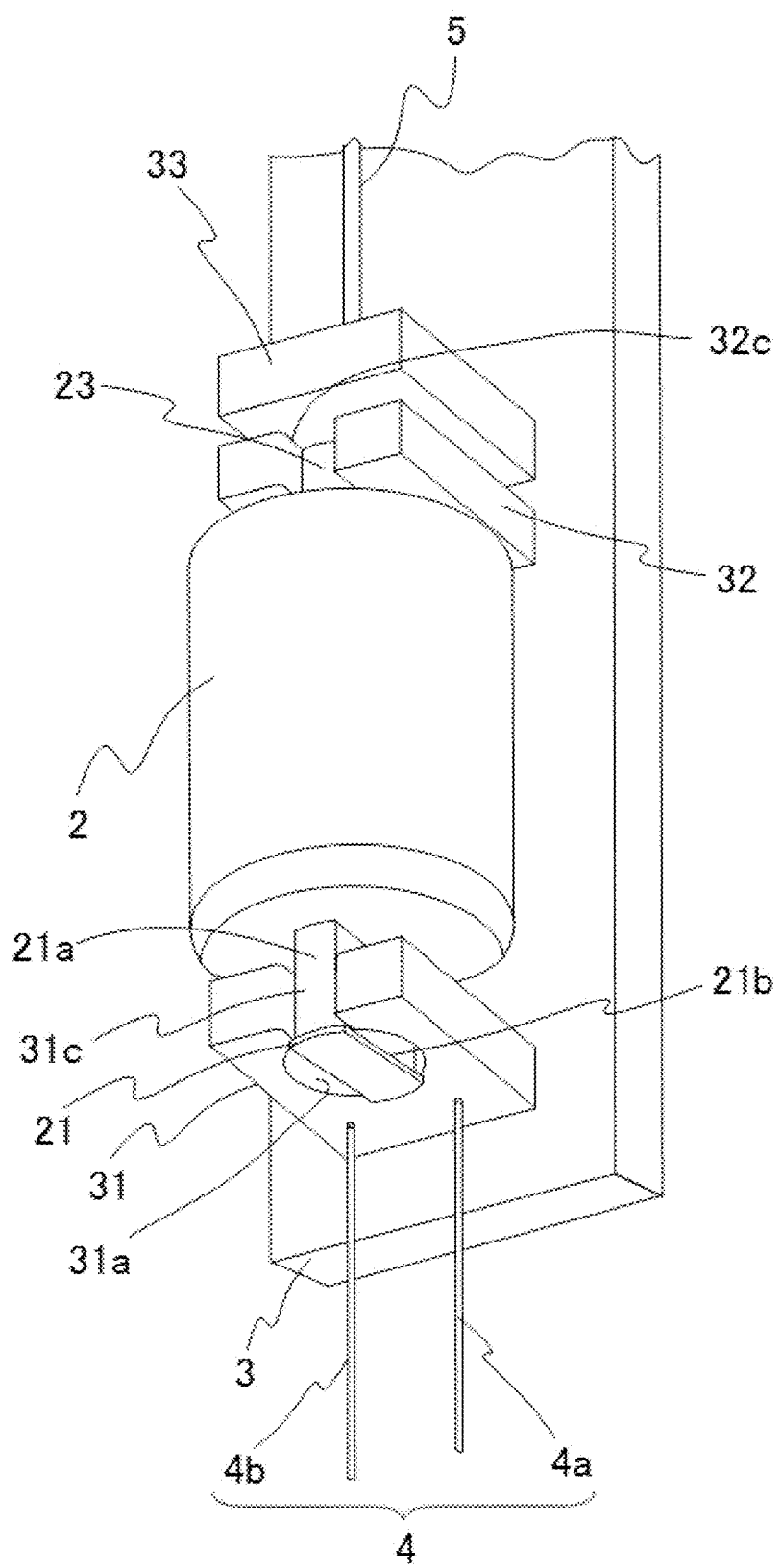
FIG. 7 shows the attachment and detachment apparatus of Embodiment 3 to which the present invention is applied, in a state after the filter container is installed to the manifold, and before the filter container is fixed to the manifold.

Subsequently, with reference to FIG. 6 to FIG. 10, Embodiment 2 of the present invention will be described. FIG. 6 shows a filter container attachment and detachment apparatus 6 in a filtration apparatus used for filtration of fluid with a filter in Embodiment 2 of the present invention. The filter container attachment and detachment apparatus 6 is the same in that the filter container attachment and detachment apparatus 6 is an attachment and detachment apparatus that is attached to the manifold 3, and that detaches and attaches the filter container 2 incorporating the filter. Hereinafter, in Embodiment 2, a description will be given of the points that are different from Embodiment 1.

While one upstream flow path 4 is arranged in Embodiment 1, Embodiment 2 can also be configured by a plurality of flow paths of a plurality of systems. That is, Embodiment 2 includes, for example, two flow paths of different systems as the upstream flow path 4. That is, the upstream flow path 4 includes a first upstream flow path 4a and a second upstream flow path 4b, and each is fluidly connected to the first mounting protrusion holding part 31. The first upstream flow path 4a and the second upstream flow path 4b may let the same fluid flow, or may let different fluids flow. Embodiment 2 is different in that the first mounting protrusion 21 can switch the flow channel between the first upstream flow path 4a and the second upstream flow path 4b. Additionally, similar to the upstream flow path 4, the downstream flow path 5 may also be configured by a plurality of flow paths of a plurality of systems.

Figure 9:
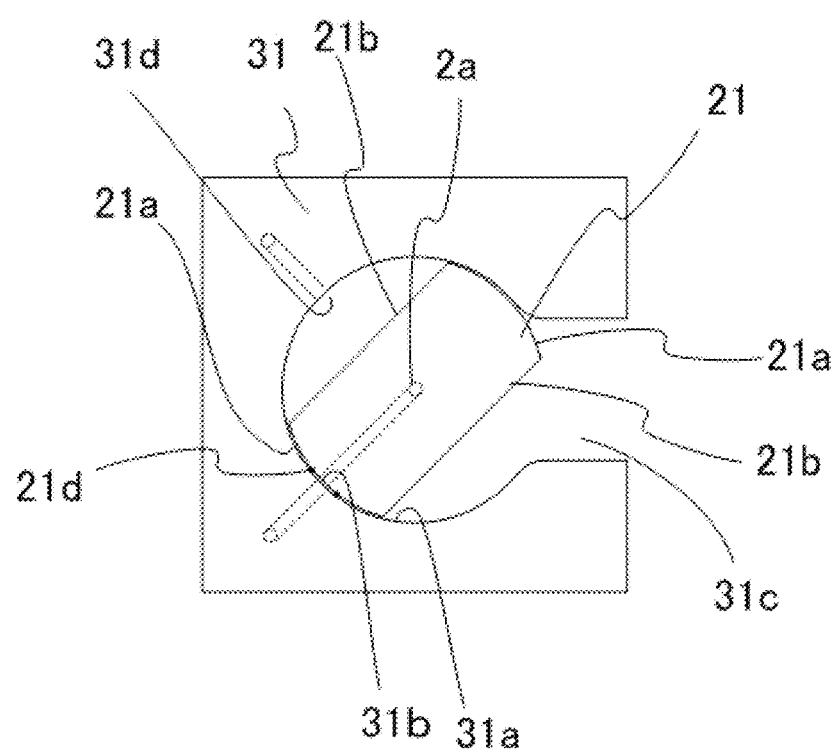
FIG. 9 is a diagram showing the cross-section 9-9 of FIG. 8.

The first upstream flow path 4a communicates with the inner periphery surface 31a of the first mounting protrusion holding part 31 so as to form the opening 31b. On the other hand, the second upstream flow path 4b communicates with the inner periphery surface 31a of the first mounting protrusion holding part 31 so as to form an opening 31d. In the state where the filter container 2 is attached to the manifold 3, the opening 31b and the opening 31d are arranged at different positions about the rotation axis 2c (FIG. 9).

On the other hand, unlike Embodiment 1, the downstream flow path 5 is not attached to the second mounting protrusion holding part 32. Instead of the second mounting protrusion 22 in Embodiment 1, a mounting protrusion 23 is arranged at the filter container 2. A cylindrical flow channel port 23a, which is connected to the internal space inside which a filter is arranged, is attached to the mounting protrusion 23. The flow channel port 23a can also be directly attached to the filter container 2. In this case, the second mounting protrusion holding part 32 that rotatably holds the mounting protrusion 23 becomes unnecessary. The position of the flow channel port 23a, the mounting protrusion 23 does not have the angular dependence about the rotation center axis 2c. For example, the flow channel port 23a is arranged so as to extend in a direction of the rotation center axis 2c. A holding block 33 is attached to a second mounting protrusion holding part 32 side. The holding block 33 includes a hole 33a that rotatably receives the flow channel port 23a, and to which the upstream flow path 4 is fluidly connected. In this manner, even if the filter container 2 is rotated about the rotation center axis 2c, the flow channel port 23a can always be fluidly connected to the downstream flow path 5. Here, although the description has been given as the embodiment in which the upstream flow path 4 is on the lower side in the vertical direction and the downstream flow path 5 is on the upper side in the vertical direction, conversely, the upstream flow path 4 may be on the upper side in the vertical direction and the downstream flow path 5 may be on the lower side in the vertical direction.

Subsequently, the attachment and detachment apparatus of Embodiment 2 will be described. The filter container 2 is attached to the manifold 3. On this occasion, the filter container 2 is attached to the manifold 3 such that the first mounting protrusion 21 is inserted into the notch 31c of the first mounting protrusion holding part 31, and the second mounting protrusion 22 is inserted into the notch 32c of the second mounting protrusion holding part 32, respectively. On this occasion, the first mounting protrusion 21 is inserted until one of the curved surfaces 21a contacts the inner periphery surface 31a of the first mounting protrusion holding part 31, such that the surfaces 21b follow along the wall surfaces of the notch 31c. Here, the filter container 2 is entirely lowered, and a discharge mounting protrusion 23 of the filter container 2 is inserted into the hole 33a of a discharge block 33. In this manner, the downstream flow path 5 and the second flow path 2b are always fluidly connected to each other. Additionally, on this occasion, the position of the filter container flow path hole 21c does not match the position of the opening 31b of the inner periphery surface 31a of the first mounting protrusion holding part 31. This state is the same as that of Embodiment 1 in that the upstream flow path 4 is not connected to the first flow path 2a, and the upstream flow path 4 and the first flow path 2a are not fluidly connected to each other.

Figure 8:
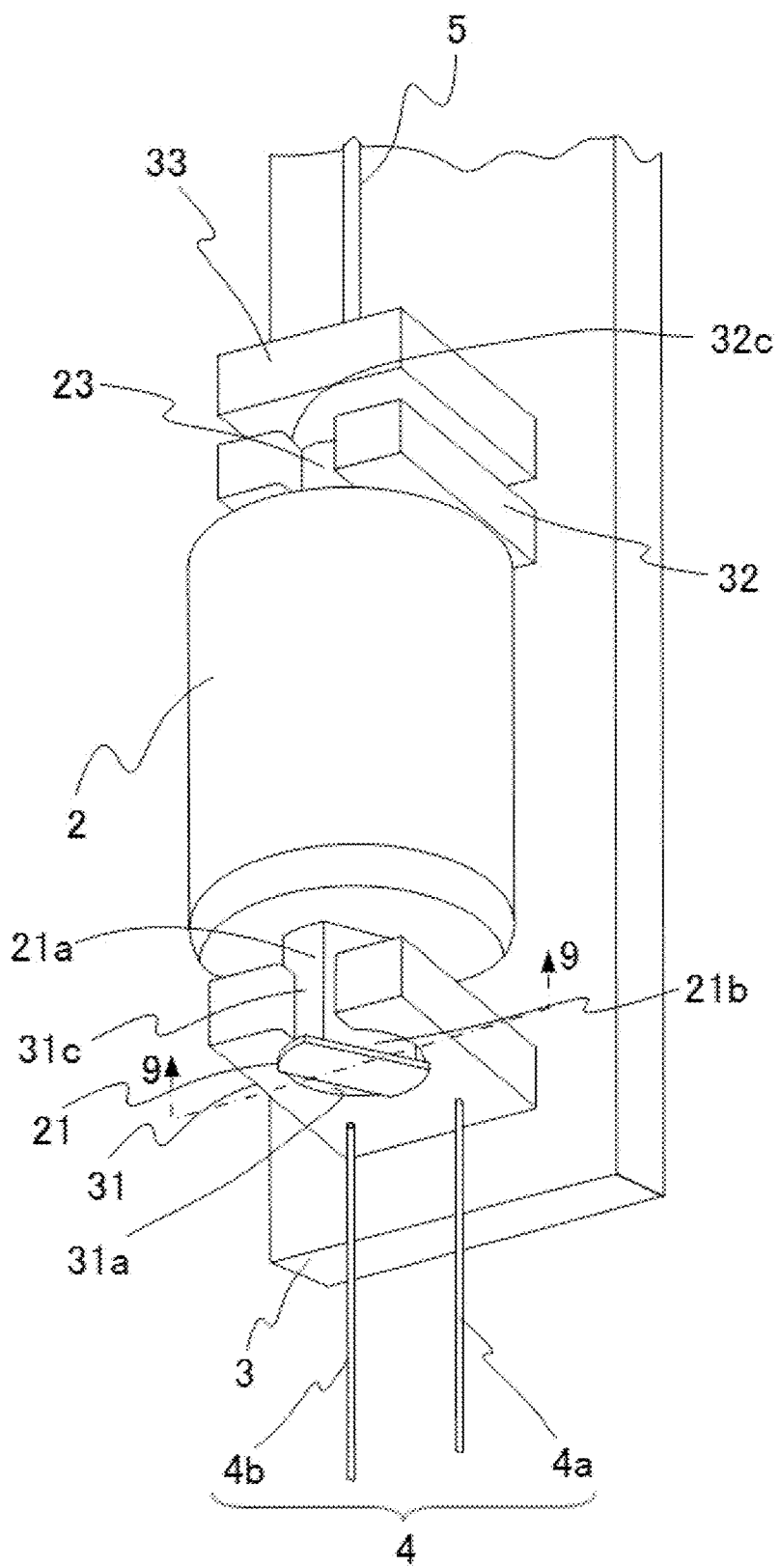
FIG. 8 shows the attachment and detachment apparatus of Embodiment 3 to which the present invention is applied, in a state after the filter container is installed to the manifold, and after the filter container is fixed to a flow channel in one direction.

Subsequently, as in Embodiment 1, the filter container 2 is rotated about the rotation center axis 2c of the filter container 2 until the position at which the first flow path 2a and the first downstream flow path 4a are fluidly connected to each other, i.e., the position at which the filter container flow path hole 21c matches the opening 31b of the inner periphery surface 31a of the first mounting protrusion holding part 31 (FIG. 8). On this occasion, the sealant 21d is crushed by the inner periphery surface 31a of the first mounting protrusion holding part 31, and the inner periphery surface 31a of the first mounting protrusion holding part 31 sandwiches the first mounting protrusion 21. In this state, the first upstream flow path 4a and the first flow path 2a are fluidly connected to each other for the first time. A route is completed that passes from the first upstream flow path 4a to the downstream flow path 5 through the filter in the filter container 2 via the first flow path 2*a*, and via a discharge port 23*a*.

Figure 10:
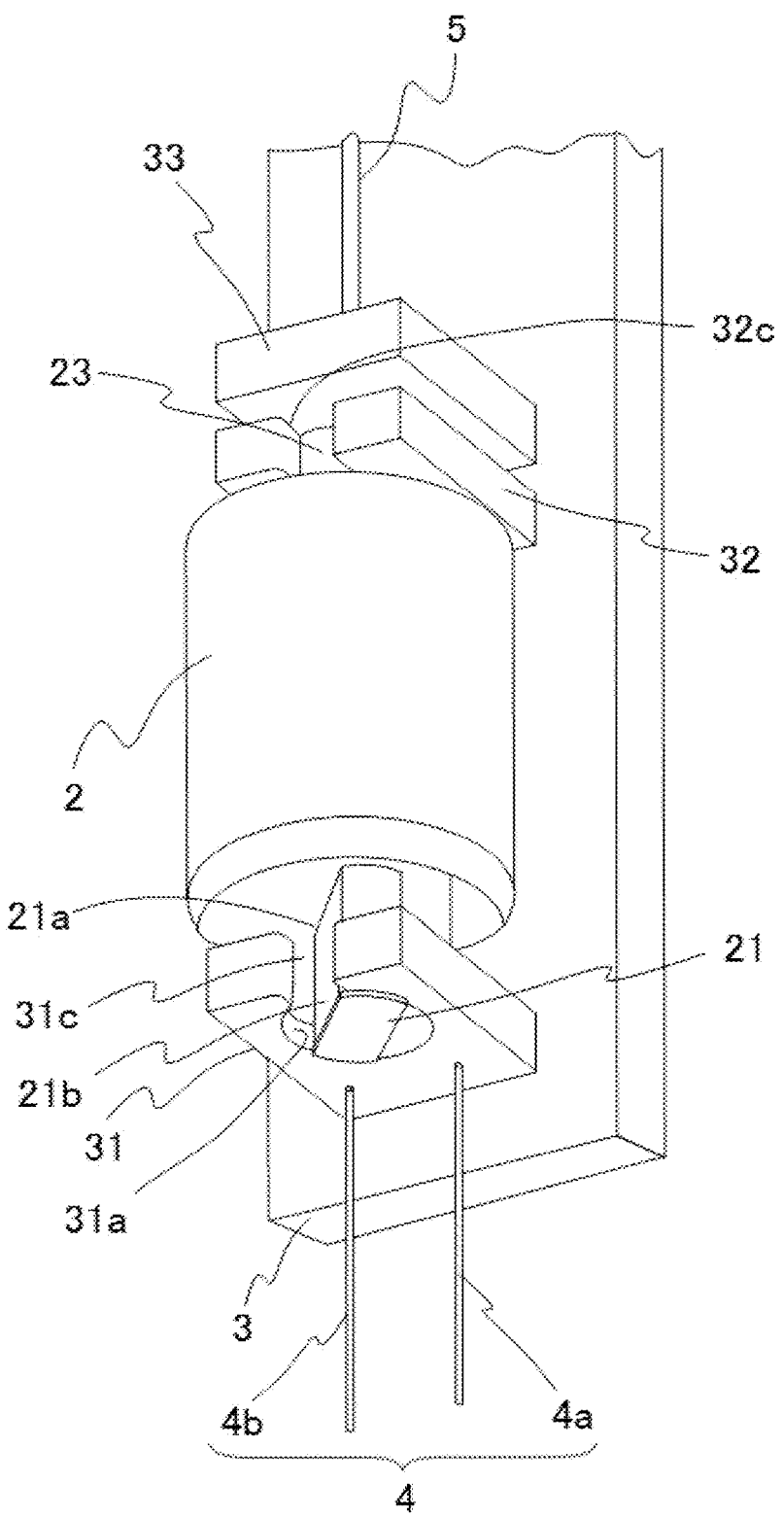
FIG. 10 shows the attachment and detachment apparatus of Embodiment 3 to which the present invention is applied, in a state after the filter container is installed to the manifold, and after the filter container is fixed to a flow channel in other direction.

Next, in Embodiment 2, this route can be switched to a route that passes from the second upstream flow path 4*b* to the downstream flow path 5 through the filter in the filter container 2 via the first flow path 2*a*, and via the discharge port 23*a*. That is, since the opening 31*d* of the second upstream flow path 4*b* is drilled in the inner periphery surface 31*a* of the first mounting protrusion holding part 31 at a position different from the opening 31*b* of the first upstream flow path 4*a*, the filter container 2 is rotated about the rotation center axis 2*c* of the filter container 2 to the position at which the filter container flow path hole 21*c* matches the opening 31*d* of the inner periphery surface 31*a* of the first mounting protrusion holding part 31 (FIG. 10). That is, the rotation is made to the position at which the first flow path 2*a* and the second upstream flow path 4*b* are fluidly connected to each other. In this manner, the connection between the first flow path 2*a* and the first upstream flow path 4*a* is severed, and the route is completed that passes from the second upstream flow path 4*b* to the downstream flow path 5 through the filter in the filter container 2 via the first flow path 2*a*, and via the discharge port 23*a*.

REFERENCE SIGNS LIST

1, 6 filter container attachment and detachment apparatus
2 filter container
3 manifold
4 upstream flow path
4*a* first upstream flow path
4*b* second upstream flow path
5 downstream flow path
21 first mounting protrusion
22 second mounting protrusion
31 first mounting protrusion holding part
32 second mounting protrusion holding part

The invention claimed is:

1. An attachment and detachment apparatus that removably attaches a filter container containing a filter, as a part of a filtration apparatus that filters fluid with the filter,
the filter container comprising:
   a first mounting protrusion at an end of the filter container to protrude from the filter container, the first mounting protrusion having a filter container flow path in fluid communication with the filter inside the filter container,
   wherein the first mounting protrusion includes a rotation center axis,
   wherein an outer periphery surface of the first mounting protrusion includes at least two curved surfaces respectively formed to be at least a part of an arc surface about the rotation center axis in a cross-section on a surface perpendicular to the rotation center axis, and two surfaces connected to the at least two curved surfaces,
the attachment and detachment apparatus comprising:
   a first mounting protrusion holding part having an inner periphery surface corresponding to the two curved surfaces of the outer periphery surface to hold the first mounting protrusion,
   wherein the first mounting protrusion holding part having a holding part flow path for the fluid,
   wherein the first mounting protrusion holding part includes a notch communicating between an area surrounded by the inner periphery surface and an outer side of the first mounting protrusion holding part, and
   wherein a width of the notch on the surface perpendicular to the rotation center axis is greater than a length of a longer one of chords of the arc surfaces of the two curved surfaces on the surface perpendicular to the rotation center axis.

2. The attachment and detachment apparatus according to claim 1,
   wherein the holding part flow path has an opening on the inner periphery surface of the first mounting protrusion holding part,
   wherein the filter container flow path has a filter container flow path hole on either of the at least two curved surfaces of the first mounting protrusion, and
   wherein the opening of the first mounting protrusion holding part matches the filter container flow path hole of the filter container at an arbitrary portion of the inner periphery surface of the first mounting protrusion holding part by rotating the filter container about the rotation center axis, and the opening of the first mounting protrusion holding part does not match the filter container flow path hole of the filter container at portions other than the arbitrary portion.

3. The attachment and detachment apparatus according to claim 2,
   wherein the first mounting protrusion holding part has another opening into which the fluid flows, the another opening being different from the opening formed in the inner periphery surface of the first mounting protrusion holding part, and
   wherein the another opening of the first mounting protrusion holding part and the filter container flow path hole are fluidly connected to each other.

4. The attachment and detachment apparatus according to claim 1, wherein the inner periphery surface of the first mounting protrusion holding part and the notch of the first mounting protrusion holding part are connected with a curved surface.

5. The attachment and detachment apparatus according to claim 4,
   wherein the first mounting protrusion holding part has another opening into which the fluid flows, the another opening being different from the opening formed in the inner periphery surface of the first mounting protrusion holding part.

6. The attachment and detachment apparatus according to claim 1, wherein the first mounting protrusion has a flange at an end of the first mounting protrusion, the flange having a portion with a diameter larger than a diameter of the inner periphery surface of the first mounting protrusion holding part.

7. The attachment and detachment apparatus according to claim 6,
   wherein the first mounting protrusion holding part has another opening into which the fluid flows, the another opening being different from the opening formed in the inner periphery surface of the first mounting protrusion holding part.

8. The attachment and detachment apparatus according to claim 1,
   wherein the filter container includes a second mounting protrusion provided at another end of the filter container to protrude from the filter container, the another end being opposite to the end, the second mounting protrusion having another filter container flow path in fluid communication with the filter inside the filter container, wherein the second mounting protrusion is concentric with the rotation center axis, wherein an outer periphery surface of the second mounting protrusion includes at least two curved surfaces respectively formed to be at least a part of an arc surface about the rotation center axis in a cross-section on another surface perpendicular to the rotation center axis, and two surfaces connected to the at least two curved surfaces, wherein the attachment and detachment apparatus further comprising:

a second mounting protrusion holding part having another inner periphery surface corresponding to the two curved surfaces of the outer periphery surface of the second mounting protrusion to hold the second mounting protrusion, wherein the second mounting protrusion holding part having another holding part flow path for the fluid, wherein the second mounting protrusion holding part includes a notch communicating between an area surrounded by the another inner periphery surface of the second mounting protrusion and an outer side of the second mounting protrusions holding part, and wherein a width of the notch on the another surface perpendicular to the rotation center axis is greater than a length of a longer one of chords of the arc surfaces of the two curved surfaces.

9. The attachment and detachment apparatus according to claim 8, wherein the another holding part flow path has an opening on the another inner periphery surface of the second mounting protrusion holding part, wherein the another filter container flow path has another filter container flow path hole on either of the at least two curved surfaces of the second mounting protrusion, and wherein the opening of the second mounting protrusion holding part matches the another filter container flow path hole of the filter container at an arbitrary portion of the another inner periphery surface of the second mounting protrusion holding part by rotating the filter container about the rotation center axis, and the opening of the second mounting protrusion holding part does not match the another filter container flow path hole of the filter container at portions other than the arbitrary portion.

10. The attachment and detachment apparatus according to claim 9, wherein the first mounting protrusion holding part has another opening into which the fluid flows, the another opening being different from the opening formed in the inner periphery surface of the first mounting protrusion holding part, and wherein the another opening of the first mounting protrusion holding part and the filter container flow path hole are fluidly connected to each other.

11. The attachment and detachment apparatus according to claim 8, wherein the another inner periphery surface of the second mounting protrusion holding part and the notch of the second mounting protrusion holding part are connected with a curved surface.

12. The attachment and detachment apparatus according to claim 11, wherein the first mounting protrusion holding part has another opening into which the fluid flows, the another opening being different from the opening formed in the inner periphery surface of the first mounting protrusion holding part.

13. The attachment and detachment apparatus according to claim 8, wherein the second mounting protrusion holding part has another flange at an end of the second mounting protrusion, the flange having a portion whose diameter is larger than a diameter of the another inner periphery surface of the second mounting protrusion holding part.

14. The attachment and detachment apparatus according to claim 13, wherein the first mounting protrusion holding part has another opening into which the fluid flows, the another opening being different from the opening formed in the inner periphery surface of the first mounting protrusion holding part.

15. The attachment and detachment apparatus according to claim 8, wherein the first mounting protrusion holding part has another opening into which the fluid flows, the another opening being different from the opening formed in the inner periphery surface of the first mounting protrusion holding part.

16. The attachment and detachment apparatus according to claim 1, wherein the first mounting protrusion holding part has another opening into which the fluid flows, the another opening being different from the opening formed in the inner periphery surface of the first mounting protrusion holding part.

\* \* \* \* \*